US011087369B1

(12) United States Patent
Bapna et al.

(10) Patent No.: US 11,087,369 B1
(45) Date of Patent: Aug. 10, 2021

(54) CONTEXT-BASED PROVISION OF MEDIA CONTENT

(71) Applicant: Facebook, Inc., Menlo Park, CA (US)

(72) Inventors: Abhishek Bapna, Mountain View, CA (US); Yi Tang, Mountain View, CA (US); Russell Aaron Phillips, San Francisco, CA (US); Merlyn Deng, Palo Alto, CA (US); Na Chen, Belmont, CA (US); Kathryn Anne Orseth, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 243 days.

(21) Appl. No.: 15/923,467

(22) Filed: Mar. 16, 2018

(51) Int. Cl.
*G06Q 30/00* (2012.01)
*G06Q 30/02* (2012.01)
*G06Q 50/00* (2012.01)
*G06N 20/00* (2019.01)
*G06F 16/28* (2019.01)
*G06F 16/22* (2019.01)

(52) U.S. Cl.
CPC ..... *G06Q 30/0277* (2013.01); *G06F 16/2228* (2019.01); *G06F 16/285* (2019.01); *G06N 20/00* (2019.01); *G06Q 50/01* (2013.01)

(58) Field of Classification Search
CPC . G06Q 30/0207–30/0277; G06Q 50/01; G06F 16/285; G06F 16/2228; G06N 20/00
USPC ............................................. 705/14.1–14.73
See application file for complete search history.

(56) References Cited

U.S. PATENT DOCUMENTS

| 9,066,122 B1* | 6/2015 | Rattazzi | H04N 21/2668 |
| 10,504,156 B2* | 12/2019 | Mok | G06Q 30/0271 |
| 2003/0221541 A1* | 12/2003 | Platt | G10H 1/0058 84/609 |
| 2009/0006375 A1* | 1/2009 | Lax | G06Q 30/02 |
| 2010/0125871 A1* | 5/2010 | Liao | G06Q 30/02 725/34 |
| 2010/0182401 A1* | 7/2010 | Yoon | H04N 5/91 348/42 |
| 2011/0184807 A1* | 7/2011 | Wang | G06Q 30/02 705/14.53 |
| 2011/0289531 A1* | 11/2011 | Moonka | G11B 27/11 725/38 |

(Continued)

OTHER PUBLICATIONS

Bauer, Elsevier, 2014.*

*Primary Examiner* — Azam A Ansari
*Assistant Examiner* — Michael I Ezewoko
(74) *Attorney, Agent, or Firm* — Fenwick & West LLP

(57) ABSTRACT

An online system provides content based on context of host content. The online system allows content providers to define specific context for providing their content for display to users, including specifying categories, format, popularity, and visual appearance of host content eligible for hosting their content. To determine which content a specific content item is eligible for hosting, the online system categories host content items according to specific criteria defined by different content providers for hosting various content. Each content is indexed by classification groups into which the host content items are classified. If a particular content item includes an opportunity for presenting content, the online system identifies content which the particular content item is eligible for hosting. The online system selects one or more identified content for presentation via the opportunity.

15 Claims, 4 Drawing Sheets

(56) References Cited

U.S. PATENT DOCUMENTS

| | | | |
|---|---|---|---|
| 2013/0085859 A1* | 4/2013 | Sim | G06Q 30/02 |
| | | | 705/14.58 |
| 2015/0248693 A1* | 9/2015 | Dubey | G06Q 30/0244 |
| | | | 705/14.43 |
| 2018/0150469 A1* | 5/2018 | Wang | G06K 9/00758 |
| 2018/0249205 A1* | 8/2018 | Li | H04N 21/44008 |

* cited by examiner

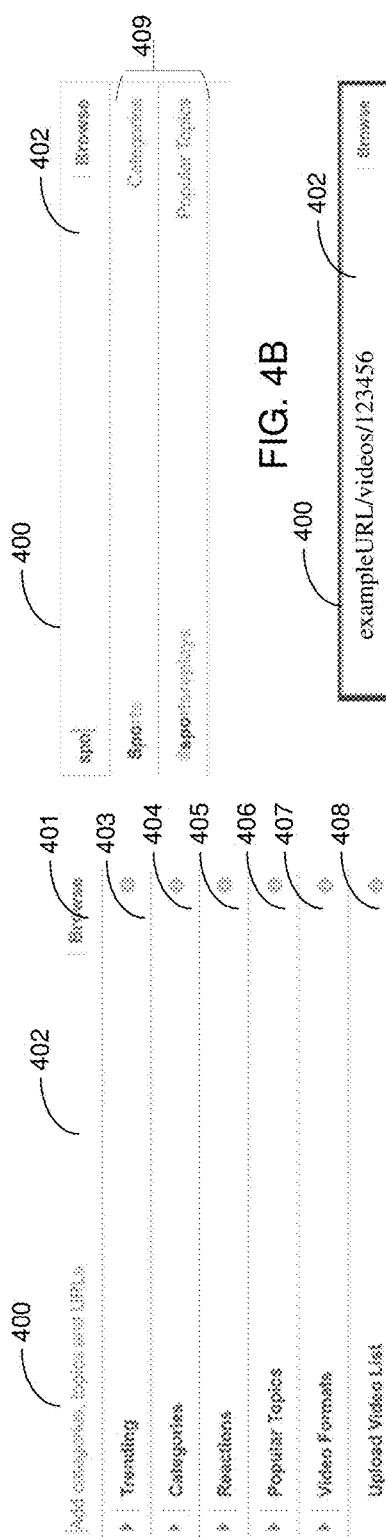
FIG. 4A
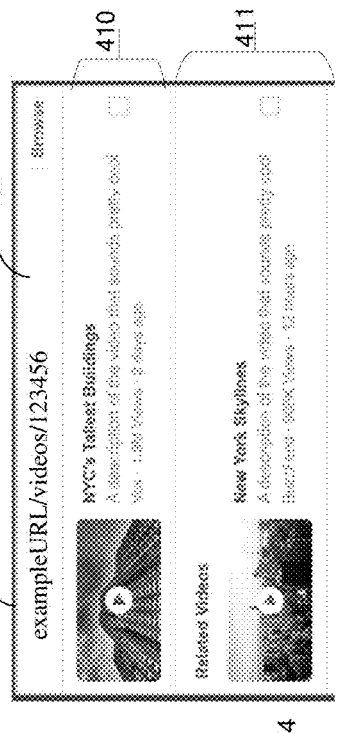
FIG. 4B
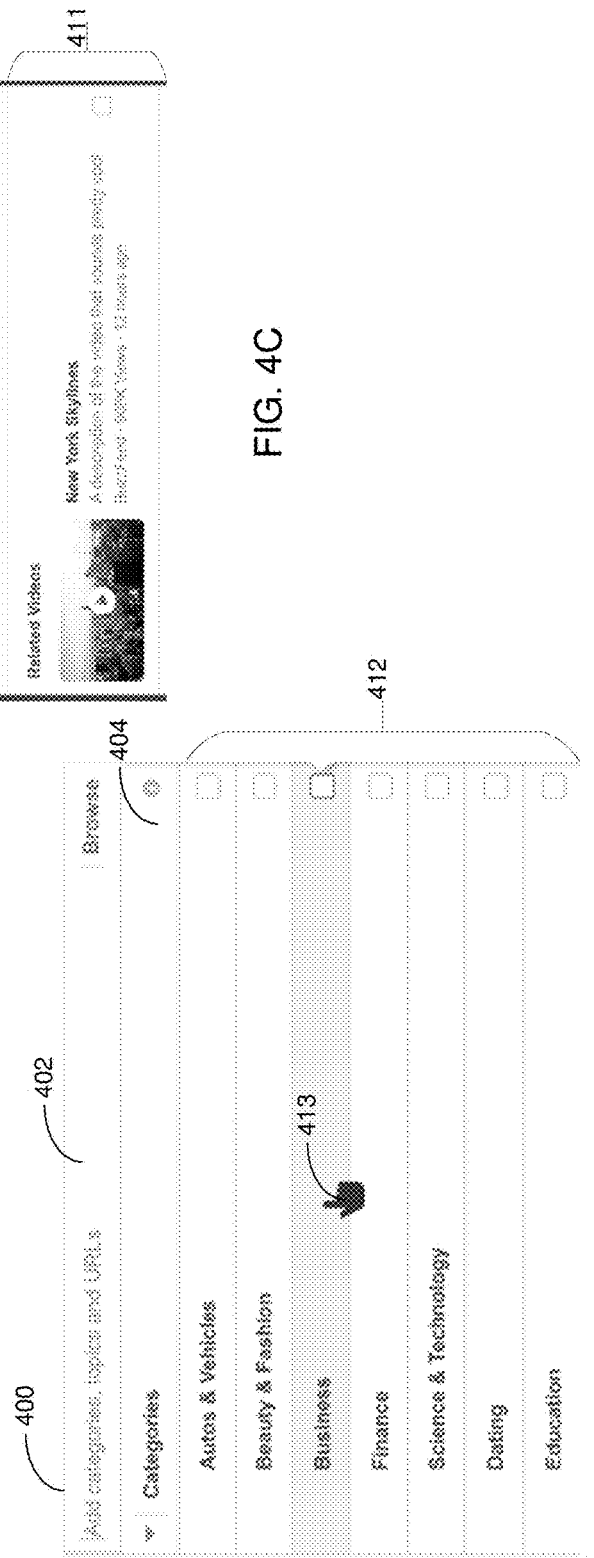
FIG. 4C
FIG. 4D

CONTEXT-BASED PROVISION OF MEDIA CONTENT

BACKGROUND

This disclosure relates generally to online systems, and more specifically to presenting media content to online system users.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Video consumption has been and will continuously surge thanks to the ubiquity of mobile devices and advancement in communication technology. This presents new opportunities for presenting content to users of online systems. Existing online systems typically present content by taking an interest-centric approach and selecting content solely based on users' interests. In some cases, the content is associated with or presented within other content (e.g., a content provider may sponsor a content item to be presented within another host content item, such as a video). Where the content item selected to be presented within the host is selected based on interests of the user, the selected content may be disengaged from or not well matched with the host video, which disrupts users' viewing experience.

SUMMARY

An online system presents content to users based on contexts of users consuming content and contexts of host content, in addition to considering users' interests. This unlocks more opportunities for content providers and media creators. In addition, provision of content that is congruent with its host content enhances user experience. Because context is highly subjective, how to accurately evaluate context of users consuming content and context of host content presents a technical problem. Specifically, given large amount of information and media content present in online systems, organizing and analyzing this tremendous amount of data, determining which data is relevant to accurately determining context, determining what additional data is needed from users for accurately determining context, identifying which content is most eligible for hosting other content, and identifying which content is least disruptive to user experience or most attractive to users are some example technical problems. The technical solutions presented in the present application accurately measure human psychology and preference, translate human psychology and preference into signals and data representation, evaluate context of media content across many different formats based on the signals and data representation, and use the evaluation of context to provide media content.

An online system allows content providers to define specific contexts for providing content, such as content that is sponsored by the providers (e.g., for which the provider provides some compensation to the online system for its presentation of the content to users). For example, a content provider specifies categories of eligible host content for hosting sponsored content, such as topics and format. In addition, the content provider can specify to use popular content for hosting sponsored content. Popular content can be trending, trending within a time frame, a geographic region, or among users of particular demographics, age groups, or geographic region, receiving certain user reactions, and the like. The sponsored content provider can further specify to use or to not use host content that looks like (or is a look alike of) example seed host content for hosting sponsored content. The online system presents user interfaces for content providers to define specific criteria that provide characteristics of eligible host content, thereby to define specific contexts for their sponsored content. Thus, the online system provides a certain level of control to content providers to define the context or host content in which their content items are presented.

To determine which sponsored content a specific content item is eligible for hosting, the online system categorizes host content items according to specific criteria defined by different sponsored content providers for hosting various sponsored content. Each sponsored content is indexed by classification groups into which the host content items are classified. If a particular content item includes an opportunity for presenting sponsored content, the online system identifies sponsored content which the particular content item is eligible for hosting. The online system uses the index of classification groups associated with the sponsored content to identify the sponsored content. The online system selects one or more identified sponsored content for presentation via the opportunity.

When classifying host content items according to the host criteria, the online system evaluates similarity between characteristics of the host content items and the host criteria. The host criteria can include explicit features and implicit features. Explicit features are explicitly described by sponsored content providers. Example explicit features include topics, formats, popularity, and user reaction received. Implicit features are implicitly described by seed host content items. Example implicit features include mood, emotion, aesthetics, and the like. The seed host content items can include positive examples and negative examples. The online system can evaluate similarities on a feature by feature basis between the host content item and the host criteria thereby to evaluate the similarity between the characteristics of the host content items and the host criteria. If the similarity exceeds a threshold, the host content item is eligible for hosting the sponsored content. The online system can use machine learning models to evaluate the similarity and/or to identify features.

BRIEF DESCRIPTION OF THE DRAWINGS

FIGS. 4A through 4E illustrate an example user interface 400 for configuring host criteria, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
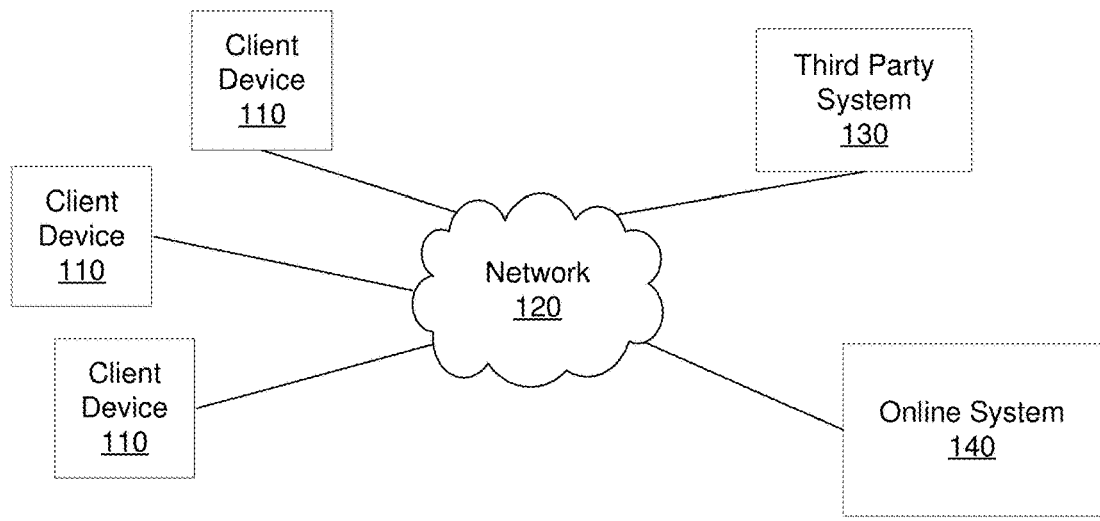
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein may be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. Example third party systems 130 include sponsored content provider systems, publisher systems, application developer systems, and the like. For example, a third party system 130 provides content or other information for presentation via a client device 110. A third party system 130 may also communicate information to the online system 140, such as advertisements, content, or information about an application provided by the third party website 130. Specifically, in one embodiment, a third party system 130 communicates sponsored content, such as advertisements, to the online system 140 for display to users of the client devices 110. The sponsored content may be created by the entity that owns the third party system 130. Such an entity may be an advertiser or a company producing a product, service, message, or something else that the company wishes to promote.

Figure 2:
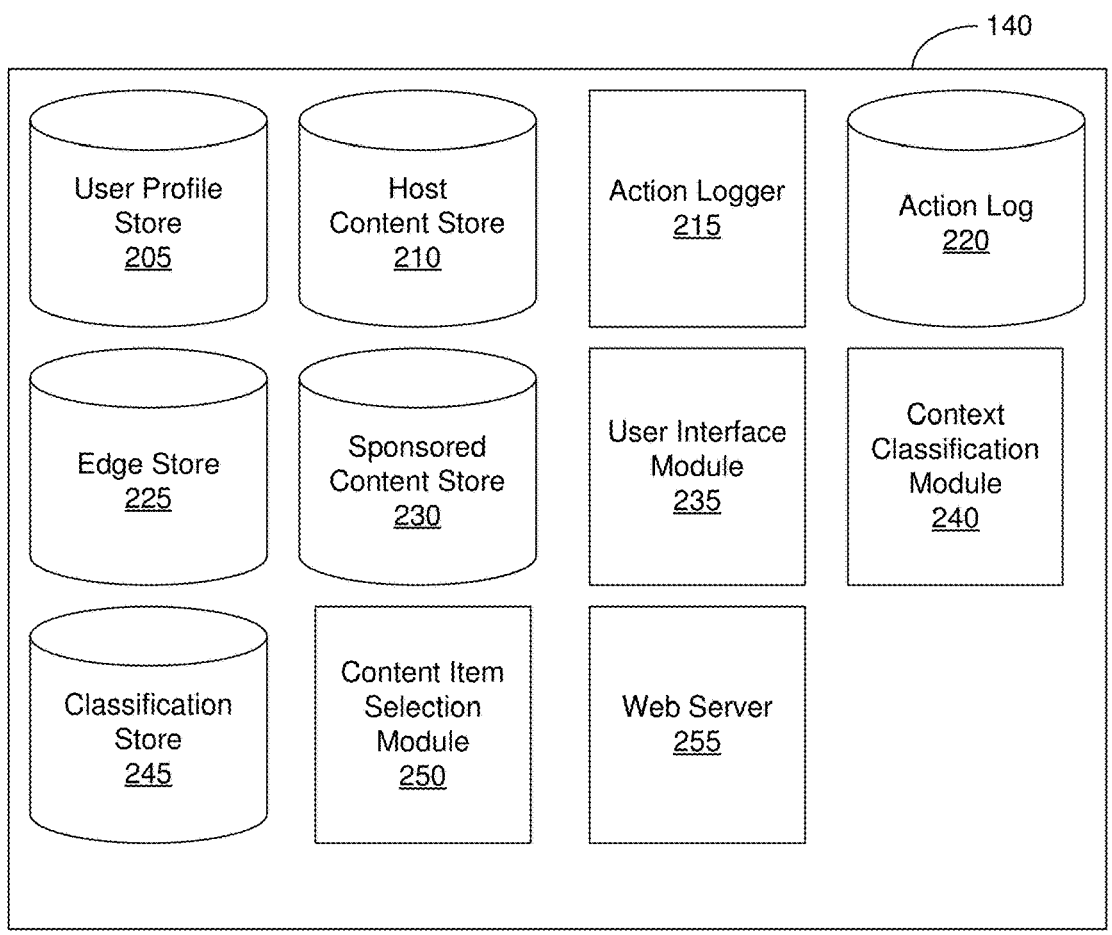
FIG. 2 is a block diagram of an online system, in accordance with an embodiment.

FIG. 2 is a block diagram of an architecture of the online system 140. The online system 140 shown in FIG. 2 includes a user profile store 205, a host content store 210, an action logger 215, an action log 220, an edge store 225, a sponsored content store 230, a user interface module 235, a context classification module 240, a classification store 245, a content item selection module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The host content store 210 stores objects that represent various types of content for hosting sponsored content. Examples of host content represented by an object include a page post, a status update, a photograph, a video, a link, a shared content item, a gaming application achievement, a check-in event at a local business, a brand page, an article (e.g., an instant article, an interactive article,) a search result, or any other type of content. In one embodiment, objects in the content store 210 represent single pieces of content, or content "items." As described herein, a host content is a content item eligible for presenting sponsored content items such that the sponsored content item is presented within, as a portion of, or directly associated with the host content. For example, a video includes a time slot or a break for presenting sponsored content, so the video can be host content that displays sponsored content (such as an advertisement, in line with the video such that the user views the ad while watching the video. As another example, an article includes a location for presenting sponsored content such that the user views the sponsored content within the article (e.g., in between paragraphs in the article). As a further example, content can be considered a host for sponsored content when the user can only view the sponsored content after selecting or clicking into the host (e.g., opening the host in a separate window, expanding the host for viewing, playing the host (e.g., a host video), etc.

Online system users or third party systems may create host content such as status updates, photos tagged by users to be associated with other objects in the online system 140, events, groups, applications, articles, videos, and the like. Host content can also be received from third-party applications or third-party applications separate from the online system 140. Users are encouraged to communicate with each other by posting text and content items of various types of media to the online system 140 through various communication channels. This increases the amount of interaction of users with each other and increases the frequency with which users interact within the online system 140.

In various embodiments, a host content item is identified by a host content item identifier (ID). The host content item is further associated with metadata describing the host content item. The metadata may include host content item characteristics such as a category (e.g., a topic (e.g., news, sports, pets, etc.), a subtopic), a video format (e.g., a content structure), an emotion or mood (e.g., happy, suspense, melancholy, etc.,) hashtags, whether the host content item is trending, and the like. The metadata may be supplied by the users providing the host content or determined by the online system 140. For example, when uploading a video, a user can label the video with one or more hashtags, a video format (e.g., trailer, movie, etc.) As another example, the online system 140 detects and identifies objects included a frame of a video, a topic of the video, the content structure, the emotion or mood, and the like. The online system 140 tracks the view counts of the host content to determine whether the host content item is trending.

In some embodiments, a host content item stored in the host content store 210 is associated with one or more host content categories stored in the classification store 245. The host content categories stored in the classification store 245 are determined by the context classification module 240 according to host criteria provided by various sponsored content providers. The context classification module 240 and the classification store 245 are further described below.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with sponsored content items as well as with other applications operating on the online system 140. In some embodiments, data from the action log 220 is used to infer interests or preferences of a user, augmenting the interests included in the user's user profile and allowing a more complete understanding of user preferences.

The action log 220 may be used by the online system 140 to track user actions on the online system 140, as well as actions on third party systems 130 that communicate information to the online system 140. Users may interact with various objects on the online system 140, and information describing these interactions are stored in the action log 220. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content items as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content store 230 stores information describing sponsored content campaigns received from one or more sponsored content providers. In one embodiment, a sponsored content is an advertisement (also referred to as an "ad"). Each sponsored content campaign includes one or more sponsored content items described by sponsored content item requests, so the sponsored content store 230 also includes information describing various sponsored content requests including sponsored content campaigns. A sponsored content campaign is associated with a set of delivery parameters (e.g., a budget, impression goal, a target average price paid, etc.)

A sponsored content campaign includes one or more sponsored content items for presentation to one or more online system users. A sponsored content item includes sponsored content such as text, image, audio, video, or any other suitable data presented to a user. In various embodiments, the sponsored content is associated with a network address specifying a landing page, or other destination, to which a user is directed when the sponsored content item is accessed. A bid amount is also associated with each sponsored content item and represents or is related to an amount of compensation, such as monetary compensation, a sponsored content provider associated with the sponsored content request provides the online system 208 in exchange for presentation of the sponsored content item. For sponsored content items that compensate the online system 140 based on actions performed by a user who receives the ad, the bid amount may be a conversion of the payment per-action to an expected value for providing a sponsored content item impression. An expected value to the online system 140 of presenting a sponsored content item may be determined based on the bid amount associated with a corresponding sponsored content item request or based on the bid amount and a likelihood of a user interacting with the sponsored content item if it is presented to the user. Examples of actions associated with a bid amount include presenting a sponsored content item to a user, receiving a user interaction with the sponsored content item, receiving a user interaction with an object associated with the sponsored content item, or any other suitable condition.

Additionally, for a particular sponsored content item, the sponsored content campaign may include one or more targeting criteria specified by the sponsored content provider. Targeting criteria included in a sponsored content request specify one or more characteristics of users eligible to be presented with the sponsored content. For example, targeting criteria are used to identify users having user profile information, edges, or actions satisfying at least one of the targeting criteria. Hence, targeting criteria allow a sponsored content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with sponsored content from a sponsored content request. As another example, targeting criteria identifies users having a connection to another user or object or having a particular type of connection to another user or object.

Furthermore, for a particular sponsored content item, the sponsored content campaign includes one or more host criteria specified by the sponsored content provider. The sponsored content provider can thus have some control over where his/her content item is presented (in which host content it is displayed) by requiring the potential host to meet certain criteria that the provider has defined. The host criteria specify one or more characteristics of host content eligible for hosting sponsored content. For example, host criteria are used to identify host content items that are of a particular category (e.g., a topic, a subtopic), that are of a particular video format, that receive a particular type of user reaction, or that are trending.

In some embodiments, host criteria may also specify host content items that look like (or is a look alike of) and/or distinct from a set of seed host content items. A seed host content item is an example specified by a sponsored content provider for the online system 140 to use as a reference for determining and selecting host content items for hosting a sponsored content item. The set of seed host content items specifies the host content provider's preferences for eligible host content items. A seed host content item can be a positive example or a negative example. The positive example includes desired characteristics and the negative example includes undesired characteristics. For example, an advertiser indicates to the online system 140 by positive example videos that videos that look similar to the positive example videos can be eligible for hosting an ad. As another example, an advertiser indicates to the online system 140 by negative example videos that videos that look similar to the negative example videos cannot be eligible for hosting an ad.

The user interface module 235 provides user interfaces for a sponsored content provider to define a sponsored content campaign. The user interfaces include user interfaces for specifying host criteria. For example, the online system 140 presents a user interface for a sponsored content provider to specify host criteria (e.g., categories, topics, user reactions, and whether trending), to browse seed host content items by categories, to browse trending videos based on topics, time frame, or geographic regions, to search for seed host content items, to upload seed host content items, to specify positive and negative examples, or to define characteristics of desired eligible host content items. Example user interfaces are further described in connection with FIGS. 4A through 4E. In one embodiment, the online system provides a user interface to the content provider when the content provider is creating a new content campaign or providing a new content item. In the user interface, the online system can provide various different example host content that the provider can scroll through to pick examples of hosts that the provider finds appropriate for or prefers to have his/her content displayed within (e.g., the provider can identify a number of positive message/sentiment videos in which his positive message ad can be displayed, and avoid videos that have more of a negative message/sentiment that would not be appropriate for hosting the positive message ad). The one or more example host content items can then be used as a seed by the online system for identifying other look alike content items, all of which can be used for hosting the provider's content.

The context classification module 240 classifies the host content items stored in the host content store 210 according to the host criteria provided by a sponsored content provider. The context classification module 240 classifies the host content items into multiple classification groups by evaluating whether they satisfy the host criteria. In some embodiments, the context classification module 240 determine a similarity between a host content item's characteristics and the host criteria to determine whether the host content item satisfies the host criteria. The host criteria may include requirements described by explicit features such as eligible host content is of a particular category, of a particular format, receive a particular type of user reaction, or is trending in a particular time frame, a geographic region, or among users of a particular demographic. The host criteria may include requirements described by implicit features such as eligible host content looks like an example host content item or ineligible host content looks like an example host content item.

Host content items classified into one classification group share similar characteristics. For example, if an advertiser specifies to use business videos that were trending in the past month to host an advertisement for promoting a luggage, the context classification module 240 classifies the host videos into a first group including business videos trending in the past month and a second group including the rest of the videos. If the advertiser further specifies to use business videos that were trending in the past month that look similar to a set of seed videos to host the advertisement for promoting the luggage, the context classification module 240 further classifies the videos in the first group by evaluating their appearance similarity to the seed videos.

To evaluate the similarity between a host content item's characteristics and host criteria, the context classification module 240 may calculate a similarity measure. The similarity measure indicate a likelihood of a host content item satisfying host criteria. The similarity measure can be calculated by evaluating each requirement defined in the host criteria to a corresponding characteristic of the host content item. A requirement or a characteristic can be represented by one or more features. If the similarity measure is greater than a threshold, then the context classification module 240 determines the host content item satisfies the host criteria. The host content items classified into one classification group are associated with similarity measures that are within a similarity measure range.

The context classification module 240 may include one or more machine learned models for classifying host content items according to the host criteria. The one or more machine learned models can determine characteristics (e.g., categories, topics, formats) of host content items such as videos or articles, content features such as video or article features, evaluate similarities between features, evaluate similarities between host content items, cluster host content items based on their similarities, and other similar functionalities. The machine learned models can be trained by using training data such as videos that have been labeled with characteristics or features or videos that have been labeled as similar.

The context classification module 240 stores the classification results in the classification store 245. Each classification group is identified by a unique classification group ID and corresponds to a sponsored content campaign. The context classification module 240 further index a particular sponsored content item with classification group IDs. In some embodiments, the similarity measure of a classification group included in the index exceeds a threshold. The classification group IDs may be ranked based on the corresponding classification groups' similarity to the host criteria.

The content selection module 250 selects one or more sponsored content items for communication to a client device 110 to be presented to a user. The content selection module 250 determines candidate sponsored content items in response to a request for sponsored content. The request for sponsored content is associated with a host content and a user viewing the host content. For example, a user requests to view a video that includes a position for presenting an ad. As another example, a user requests to read an article that includes a position for presenting an ad. The position can be a time position or a location position. One or more sponsored content items are selected from the candidate sponsored content items to fulfill the request for sponsored content. The content selection module 250 accesses one or more of the host content store 210, the sponsored content store 230, and the classification store 245 to retrieve information about the host content item. The content selection module 250 determines candidate content items based on the retrieved information. The content selection module 250 may determine eligible content items based on the retrieved information and selects candidate content items from the eligible content items. Eligible content items are associated with host criteria satisfied by the host content associated with the request for sponsored content. In some embodiments, all eligible content items are candidate content items. In some embodiments, the content selection module 250 selects a subset of the eligible content items as the candidate content items as further described below.

As one example, based on the host content item associated with the request for sponsored content, the content selection module 250 identifies one or more classification group ID(s) that are associated with the host content item. Based on the identified classification group ID(s), the content selection module 250 identifies eligible sponsored content items that are indexed by the classification group ID(s).

When determining eligible sponsored content items, the content selection module 250 further determines whether the user satisfies targeting criteria associated with the sponsored content items. That is, eligible content items are associated with host criteria satisfied by the host content associated with the request for sponsored content and targeting criteria satisfied by the user viewing the host content. The content selection module 250 may access one or more of the user profile store 205, the action log 220, and the edge store 225 to retrieve information about the user and use the retrieved information to make the determination.

The content selection module 250 may select candidate sponsored content items by based on similarity measures of the host content item associated with the request for sponsored content to the host criteria associated with the eligible sponsored content items. Eligible sponsored content items that are associated with similarity measures exceeding a threshold are selected as candidate sponsored content items.

The content selection module 250 selects one or more sponsored content items from the candidate sponsored content items to fulfill the request for sponsored content. The selection can be based on similarity measures and/or bid amounts associated with the candidate sponsored content items. For example, the content selection module 250 selects the candidate content item having the highest similarity measure for presentation to the user. Alternatively, the content selection module 250 ranks content items based on the similarity measures and selects content items having the highest positions in the ranking.

The content selection module 250 may determine an expected value for each identified candidate sponsored content item and selects the candidate sponsored content item that has a maximum expected value for presentation to the user. Alternatively, the content selection module 250 selects candidate sponsored content items that are associated with at least a threshold expected value. An expected value represents an expected amount of compensation to the online system 140 for presenting a sponsored content item. For example, for a particular sponsored content item, the expected value associated is a product of the bid amount and a likelihood of the user interacting with the sponsored content item. The content selection module 250 may rank sponsored content items based on their associated bid amounts and select sponsored content items having at least a threshold position in the ranking for presentation to the user. In some embodiments, the content selection module 250 ranks candidate sponsored content items in a unified ranking based on both associated bid amounts and similarity measures and selects candidate sponsored content items for presentation based on the ranking. Selecting ad requests and other content items through a unified ranking is further described in U.S. patent application Ser. No. 13/545,266, filed on Jul. 10, 2012, which is hereby incorporated by reference in its entirety.

The content selection module 250 presents the selected sponsored content item in the host content item for presentation to a user. The content selection module 250 may also determine an order in which selected sponsored content items are presented. For example, the content selection module 250 orders the sponsored content items based on likelihoods of the user interacting with them and presents the sponsored content items in the order. For example, the content selection module 250 includes the highest ranked sponsored content item at the most prominent position.

The web server 260 links the online system 140 via the network 120 to the one or more client devices 110, as well as to the one or more third party systems 130. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Context-Based Provision of Media Content

Figure 3:
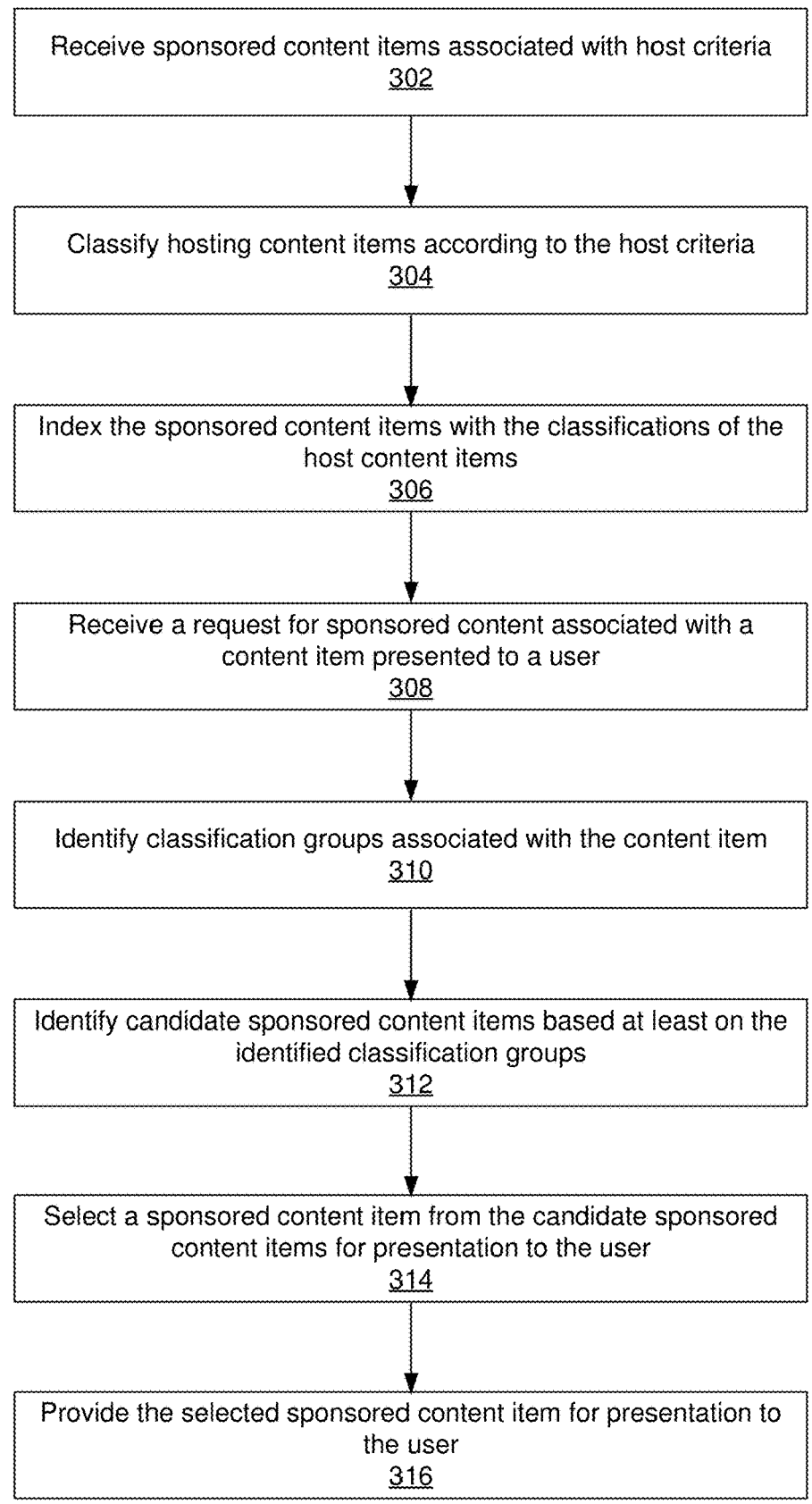
FIG. 3 is a flowchart of an example method of providing media content based on hosting media content, according to one embodiment.

FIG. 3 is a flowchart of an example method of providing media content based on contexts of host content, according to one embodiment. In other embodiments, the method may include different and/or additional steps than those shown in FIG. 3. Additionally, steps of the method may be performed in different orders than the order described in conjunction with FIG. 3 in various embodiments.

The online system 140 receives 302 sponsored content items associated with host criteria. The online system 140 may receive sponsored content campaigns from different sponsored content providers. A sponsored content item campaign includes at least one sponsored content items for presentation to users of the online system 140. A sponsored content item campaign is associated with information specifying delivery of the sponsored content items included therein. The information includes host criteria specifying characteristics of host content eligible for hosting sponsored content for one or more sponsored content items. The host criteria includes characteristics of host content items such as a category (e.g., a topic, a subtopic), a format, user reactions, a popularity, look like a set of positive seed host content items, look distinct from a set of negative seed host content items, and the like. The set of seed host videos specifies the host content provider's preferences for host content items eligible for hosting sponsored content items. The information further includes targeting criteria specifying characteristics of audience users eligible for being presented with the sponsored content items included in the sponsored content item campaign.

The online system 140 classifies 304 host content items according to the host criteria provided by different sponsored content providers. To classify a sponsored content item, the online system 140 evaluates whether the host content item satisfies the host criteria. For example, the online system 140 classifies a host content item into a sports group and a non-sports group based on the topic of the host content item. The online system 140 can determine the topic of the host content item in a variety of ways. For example, some host content items are tagged with topic labels by users such as users that upload the host content items and the online system 140 determines the topic of these host content items based on the topic labels. The online system 140 may also use a machine learned model to determine topics of host content items. The machine learned model can be trained by training data including host content items that are tagged with topic labels. The topic labels can be tagged by human experts. The online system 140 may also use a topic of a feed in which the host content item is posted as the topic of the host content item. The online system 140 classifies a host content item according to a host content item format in a similar manner.

For a particular video, the online system 140 tracks users' viewing counts and/or user reactions. The online system 140 may analyze the viewing counts and/or user reactions by a particular geographic region, a particular time window, user demographics, relative to other sponsored content items of the same topic, relative to other sponsored content items of the same format, and the like. Based on the analysis and the host criteria, the online system 140 classifies a host content item into either a group that satisfies the host criteria or another group that does not satisfy the host criteria. As one example, a sponsored content provider requests to host a sponsored content item in videos that are trending in California in the past week. The online system 140 tracks viewing counts by users located in California of all videos in the past week and classifies the videos into one of the two groups. Of the two groups, one group includes videos that are trending in California in the past week and the other includes videos that do not satisfy that criteria.

In some embodiments, the online system 140 evaluates a similarity between the host content item and the host criteria to determine whether the host content item satisfies the host criteria. That is, the online system 140 evaluates a similarity between the host content item and a set of seed host content items provided by the sponsored content provider to determine whether the host content item looks like the set of seed host content items or look distinct from the seed host content items. The similarity can be determined based on similarity in features including explicit features and implicit features. Example explicit features include a category (e.g., a topic, a subtopic), a format, user reactions, a popularity, and hashtags of a sponsored content item. Example implicit features include mood or emotion, visual appearance, visual aesthetics, overall theme, and the like. The online system 140 compares explicit and/or implicit features of a sponsored content item to those of the set of seed host content items to evaluate the similarity. In particular, the attributes are compared to those of positive examples as well as negative examples of the seed host content items to evaluate the similarity. If a host content item is similar to positive example seed host content items, then the online system 140 determines that it is likely to satisfy the host criteria. If a host content item is similar to negative example seed host content items, then the online system 140 determines that it is unlikely to satisfy the host criteria.

The online system 140 can determine the similarity in a variety of ways. For example, some host content items are grouped by users such as users that upload the host content items and the online system 140 determines the similarity for these host content items based on the uploader's grouping. The online system 140 may also use a machine learned model to determine similarity between host content items. The machine learned model can be trained by training data including host content items that are grouped into groups based on explicit and/or implicit features. The grouping can be determined by human experts based on explicit and implicit features.

The online system 140 may calculate a similarity measure when evaluating the similarity to the host criteria. The similarity measure indicate a likelihood of a host content item satisfying host criteria. The online system 140 groups the sponsored content items by the similarity measures. The similarity measure accounts for the similarity between a particular host content item's similarity and positive examples as well as to negative examples. If other features remain the same, a greater similarity to positive examples results in a higher similarity measure and a greater similarity to negative examples results in a lower similarity measure. Sponsored content items of which the similarity measures that are within a similarity measure range are grouped into one group.

The online system 140 assigns a classification group a unique classification group ID that identifies the classification group. The online system 140 associates a host content item with the classification group ID in which it is classified. A host content item can be associated with multiple classification group IDs. This is because the classification is performed for each sponsored content item according to the host criteria associated with the sponsored content item. As a result, a host content item can be classified into different classification groups that are determined according to the host criteria specified by different sponsored content providers.

After receiving the host criteria, the online system 140 classifies all host content items. When new host content items are received, the online system 140 classifies the new host content items. Accordingly, the classification step 304 includes the initial categorization of all host content items and the ongoing categorization of new host content items.

The online system 140 indexes 306 the sponsored content items by the classification of host content items. For example, the online system 140 indexes a particular sponsored content item by classification group IDs identifying classification groups determined according to the host criteria specified for the sponsored content item. Each classification group ID may be associated with a similarity measure. In some embodiments, the online system 140 indexes a sponsored content item with classification group IDs identifying classification groups of which the similarity measure exceeding a threshold. In some embodiments, the online system 140 indexes a sponsored content item with classification group IDs in a ranked order determined according to the similarity measure.

The online system 140 receives 308 a request for sponsored content associated with a content item presented to a user. The content item includes at least one position for presenting one sponsored content item. In response to the request, the online system 140 identifies eligible sponsored content items, selects candidate sponsored content items, and selects one or more sponsored content items for presentation via the at least one position to the user.

Based on the content item, the online system 140 identifies 310 classification groups that are associated with the content item. For example, the classification groups are identified by looking up the content item's ID in the classification store 245. The classification groups are determined based on host criteria provided by different sponsored content providers and indicate whether the content item is eligible for hosting sponsored content items. The associated classification groups can correspond to sponsored content items which the content item is eligible for hosting. In some embodiments, for each identified classification group, the online system 140 compares a similarity measure to a threshold similarity measure to identify sponsored content items that the content item is eligible for hosting. A sponsored content item that the content is eligible for hosting is associated with a similarity measure exceeding a threshold.

The online system 140 identifies 312 candidate sponsored content items based at least on the identified classification groups. The online system 140 may determine that all sponsored content items corresponding to the identified classification groups are candidate sponsored content items. For each sponsored content item corresponding to an identified classification group, the online system 140 may further compare characteristics of the user to the targeting criteria associated with the sponsored content item to identify candidate sponsored content item. If the characteristics of the user satisfy the targeting criteria, the online system 140 determines that the sponsored content item is a candidate sponsored content item.

The online system 140 selects 314 a sponsored content item from the candidate sponsored content items for presentation to the user. The selection is based at least on a similarity measure. The online system 140 may select to present a candidate sponsored content item that has the highest similarity measure for presentation. The selection can be further based on bid amounts. For example, the online system 140 determines an expected value for each candidate sponsored content item using the bid amount. The online system 140 selects to present the candidate sponsored content item that has the highest combined value of the similarity measure and the expected value. The online system 140 may rank the candidate sponsored content items based on the similarity value as well as the bid amounts and selects a highest ranked candidate sponsored content item for presentation to the user.

The online system provides 316 the selected sponsored content item for presentation to the user.

FIGS. 4A through 4E illustrate an example user interface 400 for configuring host criteria, according to one embodiment. In other embodiments, the arrangements of elements in the user interface may be different.

The online system 140 presents the user interface (UI) 400 to a sponsored content provider. As illustrated in FIG. 4A, the UI 400 includes user interface elements 401 through 408. The user interface elements 401 through 407 allow a user to input host criteria (e.g., explicit features, example seed videos). The user interface element 401, if triggered, allows a user to browse example videos according to the information input into the user interface element 402. In the illustrated example, the user interface element 401 is a button.

The user interface element 402 is a text box into which a user can input texts to search for videos that are relevant to the text. The text input can include a category, a type, or an URL (universal resource locator) of a video. As illustrated in FIG. 4B, the user inputs "spo" into the user interface element 402, the online system 140 determines possible categories and topics that include the text input "spo." The online system 140 presents a user interface element 409 in the user interface 400 to present a possible category "sports" and a possible topic "sportsreplays" of videos. If a user selects a possible category or a possible topic that is presented via the user interface element 409, the online system 140 presents videos that are related to the selection.

As illustrated in FIG. 4C, the user inputs a URL "exampleURL/videos/123456" to retrieve a video. The online system 140 retrieves the video "NYC's Tallest Buildings" from URL input and presents a thumbnail of the video in the user interface element 410. In addition, the online system 140 identifies that other videos "New York Skylines" and "10 Things You Don't know About the Statute" that are related to the video "NYC's Tallest Buildings" and presents thumbnails of the videos in the user interface element 411. The online system 140 determines videos that are related if they are related to a same category, a same topic, or share similar features.

Referring back to FIG. 4A, the user interface elements 403 through 407 illustrate different criteria (e.g., explicit features) for a user to select as host criteria. As illustrated in FIG. 4D, the user selects the criterion "categories" presented by the user interface element 404. The online system 140 presents different categories such as "Autos & Vehicles" and "Business" via the user interface element 412. The user moves the cursor 413 to select the category "Business" as a hosting criterion.

Referring back to FIG. 4A, the user interface element 408 allows a user to upload seed example videos. A user can specify whether an uploaded video is a positive example video or a negative example video.

Figure 4E:
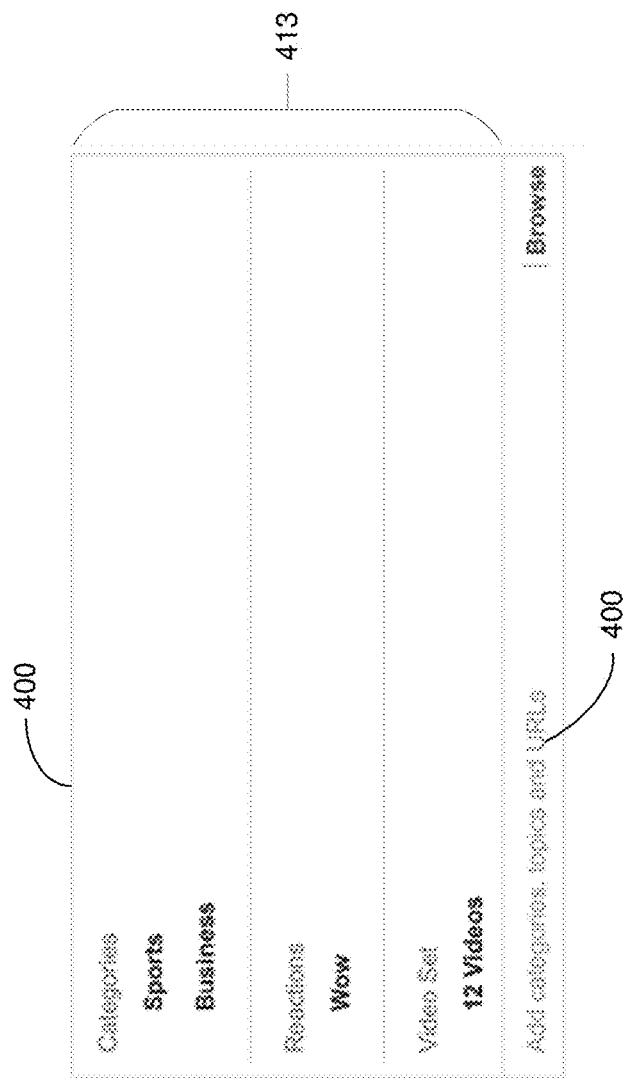

As illustrated in FIG. 4E, the online system 140 presents via the user interface 400 that host criteria specified by the use define eligible host videos are business and sports categories, receive wow reactions, and 12 seed videos.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving sponsored content items for presentation to users of an online social networking system, each sponsored content item to be presented, by the online social networking system, within a candidate host video content item and associated with a set of host criteria defining characteristics of eligible host content items for hosting the sponsored content item;
   categorizing, by the online social networking system, host content items into classification groups according to the host criteria, each classification group corresponding to a sponsored content item including host content items that share one or more characteristics, wherein the set of host criteria includes a requirement that the eligible host video content items look like a first set of seed host video content items or the eligible host content items look distinct from a second set of seed host content items, wherein categorizing host video content items according to the host criteria comprises:
      for each sponsored content item:
         evaluating whether the host video content item satisfies the set of host criteria associated with the sponsored content item by applying a machine learned model to determine whether the host video content item looks like the first set of seed host content items or to determine whether the host video content item looks like the second set of seed host content items; and
         classifying the host video content items based on the evaluation result;
   tracking, for each host video content item, social media viewership data corresponding to views of the host video content item by users of an application provided by the online social networking system;
   indexing, by the online social networking system, each sponsored content item by classification groups determined according to the corresponding host criteria;
   receiving, by the online social networking system, a request for sponsored content from a client device of a user, the request associated with a host video content item;
   responsive to the request, identifying, by the online social networking system, a set of classification groups into which the host video content item is categorized;
   identifying, by the online social networking system, a set of sponsored content items corresponding to the identified set of classification groups as candidate sponsored content items that the host video content item is eligible for hosting;
   selecting a candidate sponsored content item based at least on:
      the host video content item satisfying the host criteria associated with the candidate sponsored content item, the host criteria specifying social media viewership criteria, the host video content item having respective social media viewership data that satisfies the social media viewership criteria, and
      the user having a corresponding profile stored by the online social networking system indicating edges connecting the user to objects of the online social networking system, where at least one of the edges satisfies targeting criteria of the candidate sponsored content item; and
   providing, by the online social networking system the selected candidate sponsored content item to the client device for presentation to the user.

2. The method of claim 1, wherein evaluating whether the host video content item satisfies the set of host criteria comprises calculating a similarity measure, the similarity measure indicating a likelihood of the host video content item satisfying the set of host criteria.

3. The method of claim 1, wherein the set of host criteria includes requirements described by a set of explicit features, and evaluating whether the host video content item satisfies the set of host criteria comprises determining whether each host video content item includes the set of explicit features.

4. The method of claim 1, wherein the set of host criteria includes a requirement selected from a group consisting of eligible host video content items being of a category, of a topic, receiving a type of user reactions, and of a format.

5. The method of claim 1, wherein the set of host criteria includes requirements described by a set of implicit features, and evaluating whether the host content item satisfies the set of host criteria comprises determining whether each host content item includes the set of implicit features by applying a machine learned model to identify whether the host content item includes the set of implicit features.

6. The method of claim 1, wherein identifying a set of sponsored content items as candidate sponsored content items that the host video content item is eligible for hosting comprises:
   calculating a similarity measure between the host video content item's characteristics and the set of host criteria corresponding to each sponsored content item of the identified set,
   wherein each candidate sponsored content item is associated with a corresponding similarity measure exceeding a threshold similarity measure.

7. The method of claim 1, wherein each sponsored content item is further associated with a set of targeting criteria defining characteristics of eligible audience users and wherein identifying a set of sponsored content items as candidate sponsored content items that the host video content item is eligible for hosting comprises:
obtaining information about the user; and
determining whether the user is an eligible audience user based on the obtained information and the set of targeting criteria,
wherein the user is eligible for being presented with each candidate sponsored content item.

8. The method of claim 1, further comprising:
presenting, to a content provider from whom the online system received one or more sponsored content items, a user interface for configuring the set of host criteria allowing the content provider to designate characteristics of host content video items eligible for hosting the sponsored content items provided by the content provider; and
receiving the set of host criteria via the user interface.

9. The method of claim 2, wherein the host video content items included in each classification group are associated with similarity measures that are within a threshold range.

10. The method of claim 3, wherein determining whether each host video content item includes the set of explicit features comprises applying a machine learned model to identify whether the host content item includes the set of explicit features.

11. A computer program product comprising a non-transitory computer readable storage medium having instructions encoded thereon that, when executed by a processor, cause the processor to perform operations of:
receiving sponsored content items for presentation to users of an online social networking system, each sponsored content item to be presented, by the online social networking system, within a candidate host video and associated with a set of host criteria defining characteristics of eligible host content items for hosting the sponsored content item;
categorizing, by the online social networking system, host content items into classification groups according to the host criteria, each classification group corresponding to a sponsored content item including host content items that share one or more characteristics, wherein the set of host criteria includes a requirement that the eligible host video content items look like a first set of seed host video content items or the eligible host content items look distinct from a second set of seed host content items, wherein categorizing host video content items according to the host criteria comprises:
for each sponsored content item:
evaluating whether the host video content item satisfies the set of host criteria associated with the sponsored content item by applying a machine learned model to determine whether the host video content item looks like the first set of seed host content items or to determine whether the host video content item looks like the second set of seed host content items; and
classifying the host video content items based on the evaluation result;
tracking, for each host video content item, social media viewership data corresponding to views of the host video content item by users of an application provided by the online social networking system;
indexing, by the online social networking system, each sponsored content item by classification groups determined according to the corresponding host criteria;
receiving, by the online social networking system, a request for sponsored content from a client device of a user, the request associated with a host video content item;
responsive to the request, identifying, by the online social networking system, a set of classification groups into which the host video content item is categorized;
identifying, by the online social networking system, a set of sponsored content items corresponding to the identified set of classification groups as candidate sponsored content items that the host video content item is eligible for hosting;
selecting a candidate sponsored content item based at least on:
the host video content item satisfying the host criteria associated with the candidate sponsored content item, the host criteria specifying social media viewership criteria, the host video content item having respective social media viewership data that satisfies the social media viewership criteria, and
the user having a corresponding profile stored by the online social networking system indicating edges connecting the user to objects of the online social networking system, where at least one of the edges satisfies targeting criteria of the candidate sponsored content item; and
providing, by the online social networking system the selected candidate sponsored content item to the client device for presentation to the user.

12. The computer program product of claim 11, wherein the set of host criteria includes requirements described by a set of explicit features and a set of implicit features, and wherein the instructions for evaluating whether the host video content item satisfies the set of host criteria comprises instructions for determining whether each host video content item includes the set of explicit features and the set of implicit features.

13. The computer program product of claim 11, wherein instructions for identifying a set of sponsored content items as candidate sponsored content items that the host video content item is eligible for hosting comprises instructions for:
calculating a similarity measure between the host video content item's characteristics and the set of host criteria corresponding to each sponsored content item of the identified set,
wherein each candidate sponsored content item is associated with a corresponding similarity measure exceeding a threshold similarity measure.

14. The computer program product of claim 11, wherein each sponsored content item is further associated with a set of targeting criteria defining characteristics of eligible audience users and wherein instructions for identifying a set of sponsored content items as candidate sponsored content items that the host video content item is eligible for hosting comprises instructions for:
obtaining information about the user; and
determining whether the user is an eligible audience user based on the obtained information and the set of targeting criteria,
wherein the user is eligible for being presented with each candidate sponsored content item.

15. The computer program product of claim 11, further comprising instructions for:

presenting, to a content provider from whom the online system received one or more sponsored content items, a user interface for configuring the set of host criteria allowing the content provider to designate characteristics of host video content items eligible for hosting the sponsored content items provided by the content provider; and receiving the set of host criteria via the user interface.

* * * * *